United States Patent

[11] 3,575,659

| [72] | Inventor | Lawrence S. Kreyer<br>Santa Barbara, Calif. |
|---|---|---|
| [21] | Appl. No. | 818,714 |
| [22] | Filed | Apr. 23, 1969 |
| [45] | Patented | Apr. 20, 1971 |
| [73] | Assignee | EG & G, Inc.<br>Bedford, Conn. |

[54] APPARATUS FOR MEASURING CHARACTERISTICS OF A SIGNAL PULSE
16 Claims, 6 Drawing Figs.

[52] U.S. Cl. ................................................. 324/189, 324/102
[51] Int. Cl. ....................................................... G04f 9/00
[50] Field of Search........................................... 324/68 (A), 68 (C), 77 (A), 102, 158, 73, 76; 328/129

[56] References Cited
UNITED STATES PATENTS
3,225,213  12/1965  Hinricks..................... 324/77(A)UX
3,250,990  5/1966  Hubbs et al................. 324/68(A)X
3,286,180  11/1966  Hubbs........................ 324/68(A)X

*Primary Examiner*—Alfred E. Smith
*Attorneys*—Kenway, Jenney and Hildreth, Ralph L. Cadwallader, Esq. and Lawrence P. Benjamin ABSTRACT: In the pulse measuring apparatus disclosed herein, a pulse input signal is applied to a plurality of discriminators to provide respective timing signals when the signal amplitude passes respective preselectable levels. Signals having amplitudes which are functions of the intervals between selected ones of these events are then provided by performing time-to-pulse-height conversions in real time. As the means performing these conversions typically cannot provide continuing or stored signals, a plurality of means are further employed to provide continuing signals representative of the respective intervals.

INVENTOR.
LAWRENCE S. KREYER
BY
Kenway, Jenney & Hildreth
ATTORNEYS

INVENTOR.
LAWRENCE S. KREYER
BY
Kenway, Jenney + Hildreth
ATTORNEYS

APPARATUS FOR MEASURING CHARACTERISTICS OF A SIGNAL PULSE

BACKGROUND OF THE INVENTION

This invention relates to pulse-measuring apparatus and more particularly to such apparatus which will measure a plurality of characteristics of an input signal comprising a single, very short pulse.

While various proposals have been made for measuring the characteristics of repetitive pulse signals, many of the techniques employed are not applicable where it is desired to measure the characteristics of a single pulse. Accordingly, most studies of single pulse phenomenon have been made using various storage or memory techniques. Examples of the latter are oscillographic recording and sample-and-hold reconstruction of the waveform using tapped delay lines.

In many applications, however, there is a need for measuring a plurality of pulse characteristics or parameters in real time. For example, 100 percent testing of semiconductor and integrated circuit components is facilitated if several parameters can be simultaneously measured using a single pulse. Further, single pulse techniques are useful in testing complex digital systems such as fire control and guidance or navigation systems. Additionally, the ability to measuring the parameters of single pulses facilitates standards and calibration procedures.

Among the several objects of the present invention may be noted the provision of apparatus for directly measuring characteristics of single pulse input signals; the provision of such apparatus which will operate with very short pulse signals; the provision of such apparatus which will measure time-dependent characteristics of a single pulse signal in real time; the provision of such apparatus which will measure a plurality of characteristics of a single pulse input signal; the provision of such an apparatus which is highly accurate; and the provision of such apparatus which is reliable and which is relatively simple and inexpensive. Other objects and features will be in part apparent and in part pointed out hereinafter.

SUMMARY OF THE INVENTION

Briefly, apparatus according to this invention is operative to measure a plurality of characteristics of a single pulse input signal. The apparatus employs a plurality of discriminator means each of which is operative to provide a respective timing signal when the input signal passes a respective preselectable level. Each of a plurality of charging means is controlled by a respective pair of the discriminators to apply a predetermined charging current to a respective timing capacitor from the time the input signal passes a first one of the preselectable levels to the time the input signal passes a second one of the levels. One of the charging means is operative during positive-going excursions of the input signal, a second is operative during negative-going excursions of the input signal and a third is operative between excursions of opposite polarity. Associated with each of the timing capacitors is a respective means for providing a continuing signal which is representative of the peak value of the voltage on the capacitor. Accordingly, the apparatus can provide continuing signals which are functions of the rise time, fall time and duration of an input signal comprising a single pulse.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
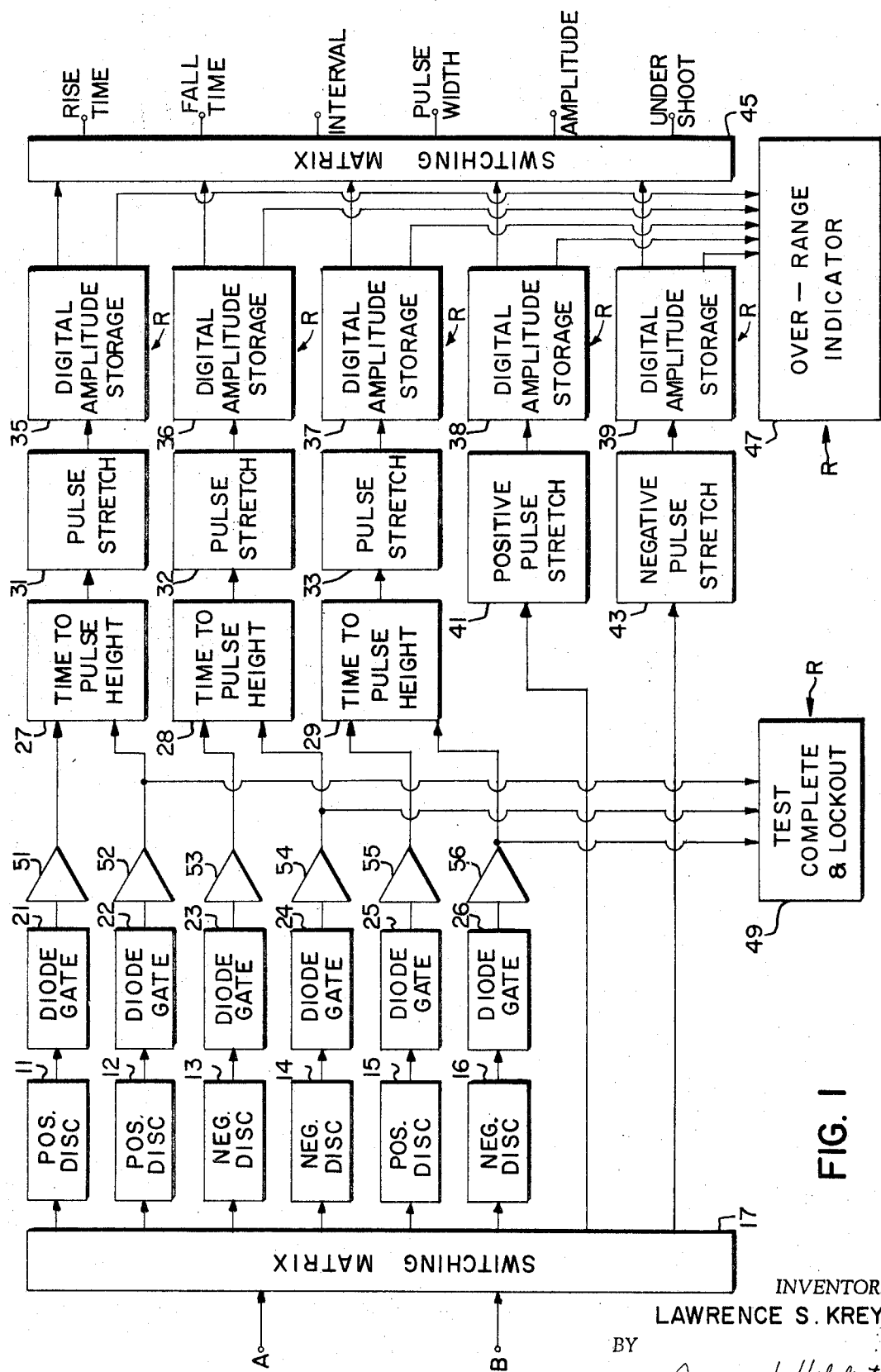
FIG. 1 is a block diagram of pulse measuring apparatus according to the present invention.

Referring now to FIG. 1, the apparatus illustrated there is operative to measure a plurality of time and/or amplitude-dependent characteristics of an input signal which comprises a single pulse These characteristics include the rise time of the pulse, the fall time of the pulse, the pulse width, the amplitude of the pulse and the pulse undershoot, if any. The apparatus is also adapted to time variously defined intervals between a pair of pulses comprising different input signals.

In measuring various of the time-dependent characteristics of a pulse input signal, the apparatus employs a plurality of discriminators 11—16 each of which is operative to provide a timing signal when the input signal passes a respective preselectable level. As indicated, three of the discriminators (13, 14 and 16) are adapted to respond to negative-going excursions of input signals applied thereto.

Input signals can be applied to the apparatus at either of a pair of input leads, designated A and B. The discriminators 11—16 are connected to the input leads through a switching matrix 17 which permits each of the discriminators to be connected to either one of the input terminals. As will be apparent hereinafter, this input switching flexibility permits the apparatus to operate with different types of input waveforms and to provide different modes of operation.

As the amplitude of a given pulse input signal will typically cross a particular preselected level twice, i.e. once during a positive-going excursion and once during a negative-going excursion, the output signals from the discriminators pass through respective diode gate 21—26 which operates, as is described in greater detail hereinafter, to pass only the signal resulting from the desired transition.

The discriminators operate in pairs, 11 and 12, 13 and 14, and 15 and 16, to control respective time-to-pulse-height converter circuits 27, 28 and 29, the timing signals being applied to the converter circuits through respective amplifiers 51—56. Each time-to-pulse-height converter operates to provide an output signal having an amplitude which is a function of the length of the interval between the successive timing signals applied thereto.

Since the present apparatus is intended for use with input pulses which have pulse widths in the nanosecond range, it will be seen that the time intervals which are to be converted to pulse height are extremely brief. As the time-to-pulse-height conversion typically involves the charging of a timing capacitor which must be very small when short times are involved, it will be understood that the output signal from the converter circuitry will itself typically be a pulse of relatively short duration. The output pulses from the time-to-pulse-height converters 27—29 are stretched in pulse-stretching circuits 31—33. Each of these circuits is essentially operative to provide a signal which persists or continues for a substantial length of time and which is substantially proportional to the peak value of the input signal applied thereto.

A plurality of digital amplitude storage circuits 35—37 respond to the stretched pulse amplitude signals and provide output signals which are digitally stored and which thus continue substantially indefinitely. In other words, these storage circuits provide signals which are independent of the decay of the signals provided by the time-to-pulse-height converter circuits 27—29 or the leakage time constants of the pulse-stretching circuits 31—33.

A selected one of the input signals (A or B) provided to the apparatus can also be applied directly to a positive pulse-stretching circuit 41 and a negative pulse-stretching circuit 43. These circuits operate directly on single pulse input signals applied thereto to generate continuing signals which are substantially proportional to the positive peak voltage and negative peak voltage, respectively, of the input waveforms.

Digital amplitude storage circuits 38 and 39 are provided for generating output signals which continue indefinitely, independently of the leakage time constant of the pulse-stretching circuit.

The output signals provided by the digital amplitude storage circuits 35—39 are applied, through a switching matrix 45 to a plurality of output leads which may be connected to suitable utilization or indicating means. Depending upon the setting of the input switching matrix 17 and the setting of the threshold levels of the various discriminators 11—16, the continuing signals provided by a given one of the digital amplitude storage circuits 35—37 may represent rise time, fall time or pulse width to one of these output signals may represent the interval between preselected event occurring in two different input signals which are selected by the input and threshold settings. Likewise, depending upon whether the input pulse under consideration is positive-going or negative-going, the stored signals derived from the positive pulse stretch circuit and the negative pulse stretch circuit may represent amplitude and undershoot respectively, or vice versa. The various digital amplitude storage circuits 35—39 also control an over-range indicator which provides an indication of any one of the parameters being measured exceeds the accurate range of the circuitry. Further, the timing signals which terminate each time-to-pulse-height conversion are employed to control a test-complete circuit which provides an indication when all three of the sensed timing signals have been received. The over-range and test-complete indicator circuits as well as the digital storage circuits may be reset prior to the initiation of a test cycle by the application of a reset signal R.

Figure 2:
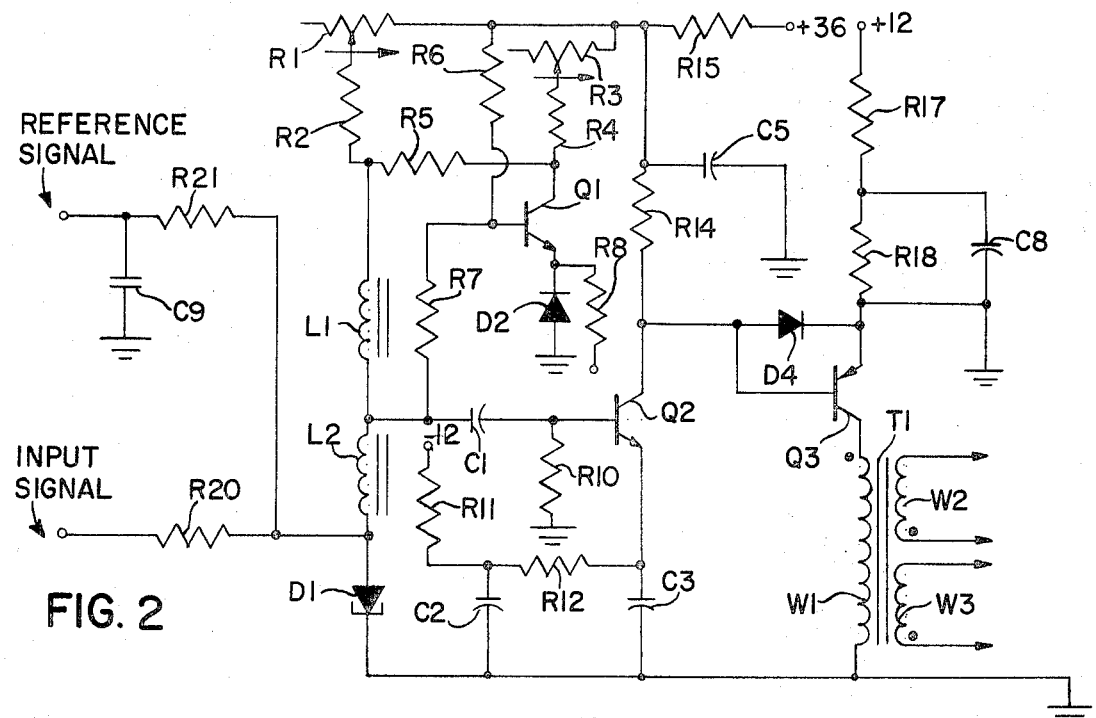
FIG. 2 is a schematic circuit diagram of a representative level discriminator employed in the FIG. 1 apparatus.

A representative one of the positive discriminators (11, 12 and 15) is illustrated in FIG. 2. In this and the other circuit diagrams, it is assumed that various supply voltages are provided as indicated. As a level-sensing mechanism, the discriminator employs the switching characteristics of a tunnel diode D1. Bias current is applied to diode D1, through a pair of inductors L1 and L2, from a pair of resistive paths. One path comprises a potentiometer R1 and a resistor R2 and the other comprises a potentiometer R3 and a pair of resistors R4 and R5. The second the three resistive paths is selectively shunted by the collector-emitter circuit of an NPN transistor Q1. A nominal bias level is applied to the base of transistor Q1 by means of a pair of resistors R6 and R7 while the voltage at the emitter is determined by means of a resistor R8 and a diode D2.

Switching transients generated by diode D1 are coupled to the base of an NPN transistor Q2 through a capacitor C1. The base of transistor Q2 is biased to ground through a resistor R10 while a negative bias is applied at its emitter through a pair of resistors R11 and R12, filtering being provided by capacitors C2 and C2. The collector of transistor Q2 is connected to the positive supply lead through a load resistor R14, the supply lead being filtered by means of a resistor R15 and a capacitor C5. The collector of transistor Q2 is also connected to the base of a PNP transistor Q3, reverse biasing of this transistor being limited by a diode D4. Current is provided to the emitter of transistor Q2 through a pair of resistors R17 and R18, filtering being provided by capacitors C7 and C8. The collector of transistor Q3 drives the primary winding W1 of a pulse transformer T1 having a pair of secondary windings W2 and W3. The polarities of the various windings are indicated in conventional fashion. The selected input signal is applied to the tunnel diode D1 through a resistor R20 while a reference signal is applied through a resistor R21, transients being shunted by a capacitor C9. The reference signal may be provided from any desired source, e.g. a fixed voltage source and a suitable high resolution potentiometer, to preselect the level at which the input signal is to trigger the discriminator. For reasons which will be apparent hereinafter, the reference signal is applied in a polarity which is opposite to the potential of the input signal at the preselected threshold.

Potentiometer R1 is adjusted so that, when the transistor Q1 is conducting, the bias current through the tunnel diode D1 is substantially equal to the characteristic valley current ($I_v$) of the diode. Similarly, the potentiometer R3 is adjusted so that, then transistor Q1 is cut off, the bias current through the diode D1 is substantially equal to the characteristic peak current ($I_p$) of the diode. The operation of the discriminator is thus substantially as follows. Assuming that the input signal is below the preselected threshold and that transistor Q1 is cut off, the reference signal will predominate over the input signal and the tunnel diode D1 will be biased at less than its peak current and the voltage across the diode will be quite small. Diode D1 will thus be effectively in its "off" condition. However, when the amplitude of the positive-going input signal exceeds the amplitude of the negative reference signal, the total current applied to the diode D1 will exceed its characteristic peak current and thus the diode will switch into its "on" condition, as is well understood in the art. The amplified switching transient thereby generated at the collector of transistor Q2 is further amplified by to a value substantially equal to the valley current. Thus, when the amplitude of the positive input signal drops below the amplitude of the negative reference signal, the diode D1 will switch back to its "off" condition. This switching transient will also be transmitted to the transformer T1 through the transistors Q2 and Q3 but, as is explained hereinafter, these reset transients are blocked by the respective diode gate 31-—36.

The negative discriminators are essentially similar to the positive discriminators and thus are not described in detail herein. However, it may be noted that the main changes necessary include: a reversal of polarity of the various diodes including the tunnel diode; the use of complementary transistor types, i.e. substituting PNP transistors for NPN transistors and NPN transistor for PNP transistors; and reversing the polarities of the various supply voltages and the reference signal.

Figure 3:
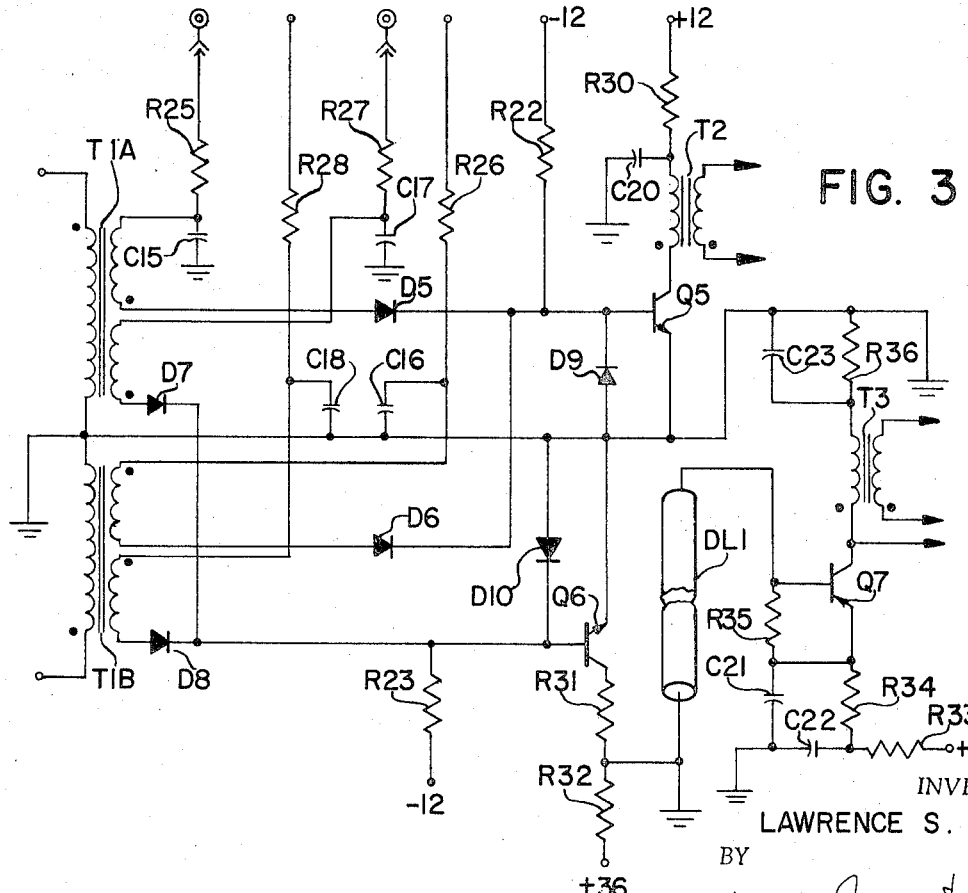
FIG. 3 is a schematic circuit diagram of representative diode gate and control amplifier circuitry employed in the FIG. 1 apparatus.

In FIG. 3, which shows the diode gates and amplifiers driven by one pair of discriminators, the output transformers of the respective discriminators are indicated at T1A and T1B, it being understood that each of these transformers is essentially equivalent to the transformer T1 in FIG. 2. One secondary winding from each output transformer is connected to the base of a first driver transistor Q5 through a respective diode D5 or D6 and the remaining secondary winding on each transformer is connected to the base of a second driver transistor Q6 through a respective diode D7 or D8. The transistors Q5 and Q6 are biased by respective resistors R22 and R23, reversed biasing being limited by diodes D9 and D10.

The diodes D5—D8 function as gates for determining which of the timing signals generated by the respective discriminators are passed from the pulse transformers T1A and T1B to driver transistors Q5 and Q6 which comprise the start and stop amplifiers, e.g. amplifiers 51 and 52. Current for forward biasing the diodes so as to effectively open the gate for the passage of signals is selectively applied to the respective secondary windings through respective resistors R25—R28, AC shunting paths being provided by capacitors C15—C18. The selection of which diodes should be forward biased depends upon the role to be played by each of the two discriminator inputs, which in turn depends upon which measurement is being made by the particular time-to-pulse-height converter. The unilateral characteristics of the diode prevent the reset pulses from driving the transistors Q5 and Q6.

Transistor Q5 directly drives a pulse transformer T2, collector current being provided through a resistor R30 with AC shunting being provided by a capacitor C20, while pulse timing signals transmitted through transistor Q6 are applied, through a delay line DL1 and a PNP transistor Q7, to a pulse transformer T3. Collector current for transistor Q6 is provided through a pair of resistors R31 and R32. Biasing of transistor Q7 is controlled by means of a network comprising resistors R33—R35 and capacitors C21 and C22 while current is provided to its collector through a resistor R36, AC bypassing being provided by a capacitor C23. As will be understood, the delay line introduces an additional time offset into the time-to-pulse-height conversion in addition to the interval between the events detected by the respective pair of discriminators. This additional time offset facilitates the operation of the time-to-pulse-height conversion circuitry described hereinafter by providing time for the capacitor charging circuitry to switch between states. The offset may then by compensated for or offset at various points in the following circuitry by a voltage shift.

Figure 4:
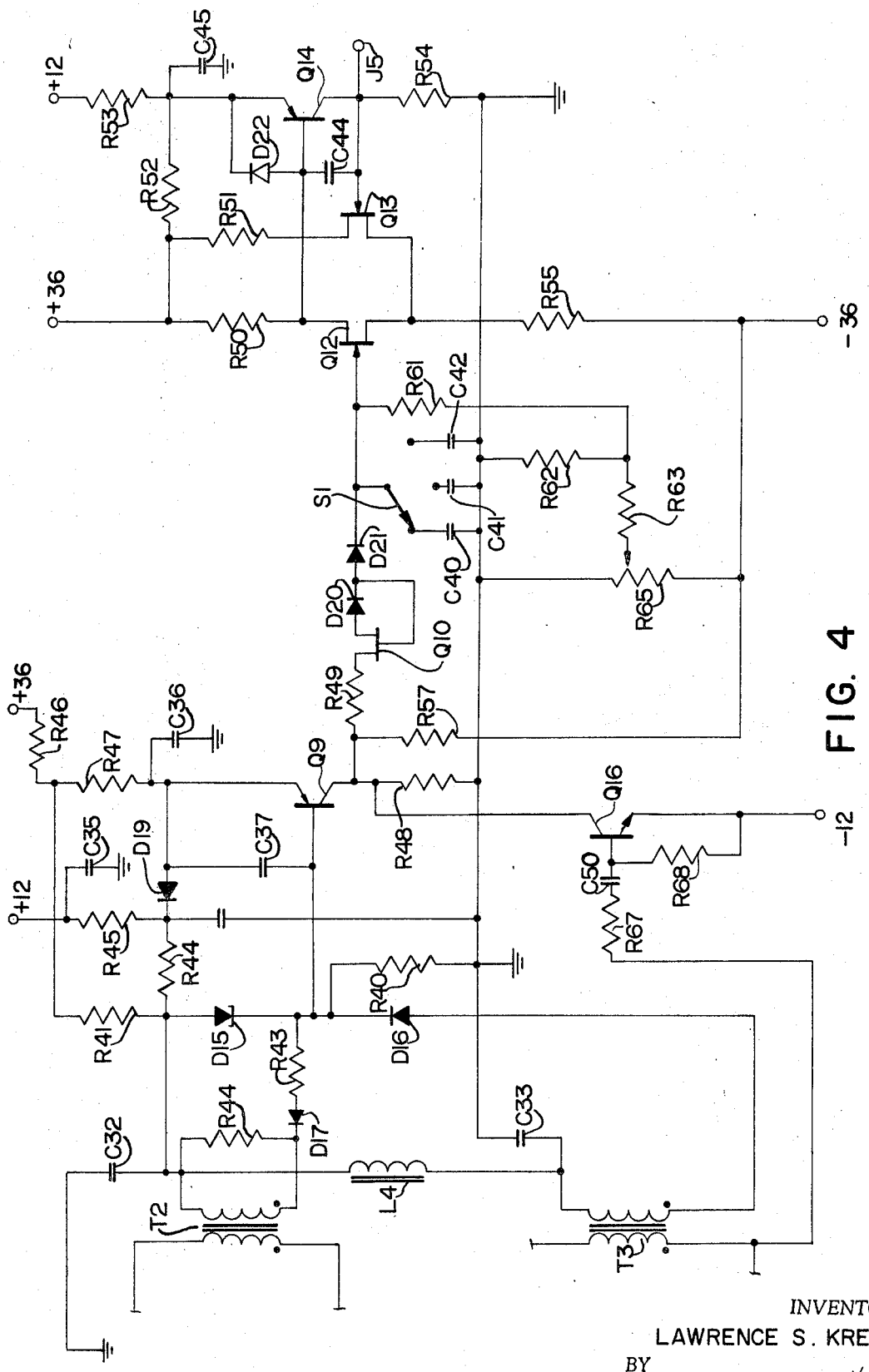
FIG. 4 is a schematic circuit diagram of a representative time-to-pulse-height conversion circuit employed in the FIG. 1 apparatus.

In FIG. 4, which illustrates a representative time-to-pulse-height converter, the transformers T2 and T3 are repeated to clarify the interconnection between successive stages. In the converter, a tunnel diode D15 is employed as a latch or switching element to control the application of a charging current to a timing capacitor, the capacitor being charged during the interval between events detected by the respective discriminators. One side of tunnel diode D15 is biased to ground through a resistor R40 while the other side is biased to the positive supply through a resistor R41. The one side of diode D15 is connected to one end of the secondary winding of transformer T2. Diode D15 is also shunted for DC by a circuit which extends through an inductor L4, the secondary winding of transformer T3, and a diode D16. Thus the voltage across diode D15 is normally held to a relatively low voltage, i.e. a voltage which is below the switching threshold of the tunnel diode. The secondary winding of transformer T2 itself is also connected across diode D15 through a circuit which includes a diode D17 and a resistor R43, the secondary winding being shunted by a resistor 44. Further, one side of each of the secondary windings is connected to ground through a respective capacitor, C32 or C33.

When a pulse which is to start a time-to-pulse-height conversion is transmitted through transformer T2, a negative pulse is transmitted through diode D17 and increases the current through tunnel diode D15 to a level above its switching threshold. The diode thus switches to its "on" state and an increased voltage appears across the diode. The diode is held in its "on" state by a holding current furnished through resistor R41. As is described hereinafter, this increased voltage initiates a timing period. Conversely, when the operation of the second discriminator causes a pulse to be transmitted through transformer T3, a positive pulse is transmitted through diode D16 to the tunnel diode D15. This positive pulse reduces the current through the tunnel diode to a level below its switching threshold, i.e. its valley current, so that the tunnel diode switches to its "off" state. Thus, the tunnel diode is in its "on" state during the interval over which a time-to-pulse-height conversion is to be made.

One side of the tunnel diode D15 is connected to the emitter of a PNP transistor Q9 through a resistor R44 and a diode D19, while the other side is connected directly to the base of the same transistor. Appropriate voltage levels are established on either side of the diode D19 by resistors R45—R47, with filtering being provided by capacitors C35 and C36. The base-emitter circuit of transistor Q9 is shunted by a capacitor C37 of small value. The collector of transistor Q9 is connected to ground through a load resistor R48 and, through a resistor R49, to a constant current circuit comprising a field-effect transistor Q10 and a diode D20. The gate terminal of the field-effect transistor Q10 is connected to its source terminal through the diode D20 so that the combination will pass a substantially constant current, as is understood by those skilled in the art, despite voltage and temperature variations.

The load resistor R48 for transistor Q9 is also shunted by the collector-emitter circuit of NPN transistor Q16. The base of this transistor is driven from the primary winding of transformer T3, i.e. from the collector of the transistor Q7 in FIG. 3, through a resistor R67 and a capacitor C50. Transistor Q6 is normally biased off by a resistor R68.

The constant current source is connected, through a diode D21 and a selector switch S1, to any one of a plurality of timing capacitors C40—C42. The voltage on the selected timing capacitor is in turn applied to an output terminal J5 through a unity gain amplifier comprising a pair of field-effect transistors Q12 and Q13 and a PNP transistor Q14 interconnected in conventional manner to provide an extremely high input impedance and minimum offset between input and output voltages.

When transistor Q9 is turned off a reverse bias is applied to the constant current source through a resistor R57 while a nominal bias voltage is established at the input of the unity gain amplifier, i.e. the gate of field-effect transistor Q12, by a network comprising resistors R61—R63 and potentiometer R65.

When the tunnel diode D15 is turned on as described previously, transistor Q9 is likewise turned on by the increased voltage which appears across its base-emitter circuit. The turning on of the transistor Q9 generates a positive voltage across load resistor R48 and thus the constant current source is forward biased. Accordingly, a constant predetermined current is applied to a selected one of the timing capacitors. The voltage on the selected timing capacitor thus rises linearly to provide a voltage which is substantially proportional to the time the charging current is applied, as is understood in the art. This voltage is applied to the output terminal J5 at relatively low impedance by the unity gain amplifier described previously.

When the tunnel diode 15 is turned off in response to a stop pulse coupled through transformer T3, the transistor Q9 is turned off thereby stopping the charging. The turning off of transistor Q9 is accelerated by the transistor Q16 which is turned on by the positive pulse coupled from the primary winding of transformer T3.

While the components of the unity gain output amplifier and the resistor R61 are selected to provide a leakage time constant which is as long as possible for the selected timing capacitor C40—C42, nonetheless the output pulse from this time-to-pulse-height converter is still of limited duration since only relatively small timing capacitors may be used at the relatively short time intervals under consideration. Accordingly, the peak amplitude of the output pulse from the converter will typically need to be stretched or stored in order to provide time for an analog-to-digital conversion. However, for a longer input pulses, the time-to-pulse-height converter can itself provide an output signal which continues long enough to permit a high speed analog-to-digital conversion.

Figure 5:
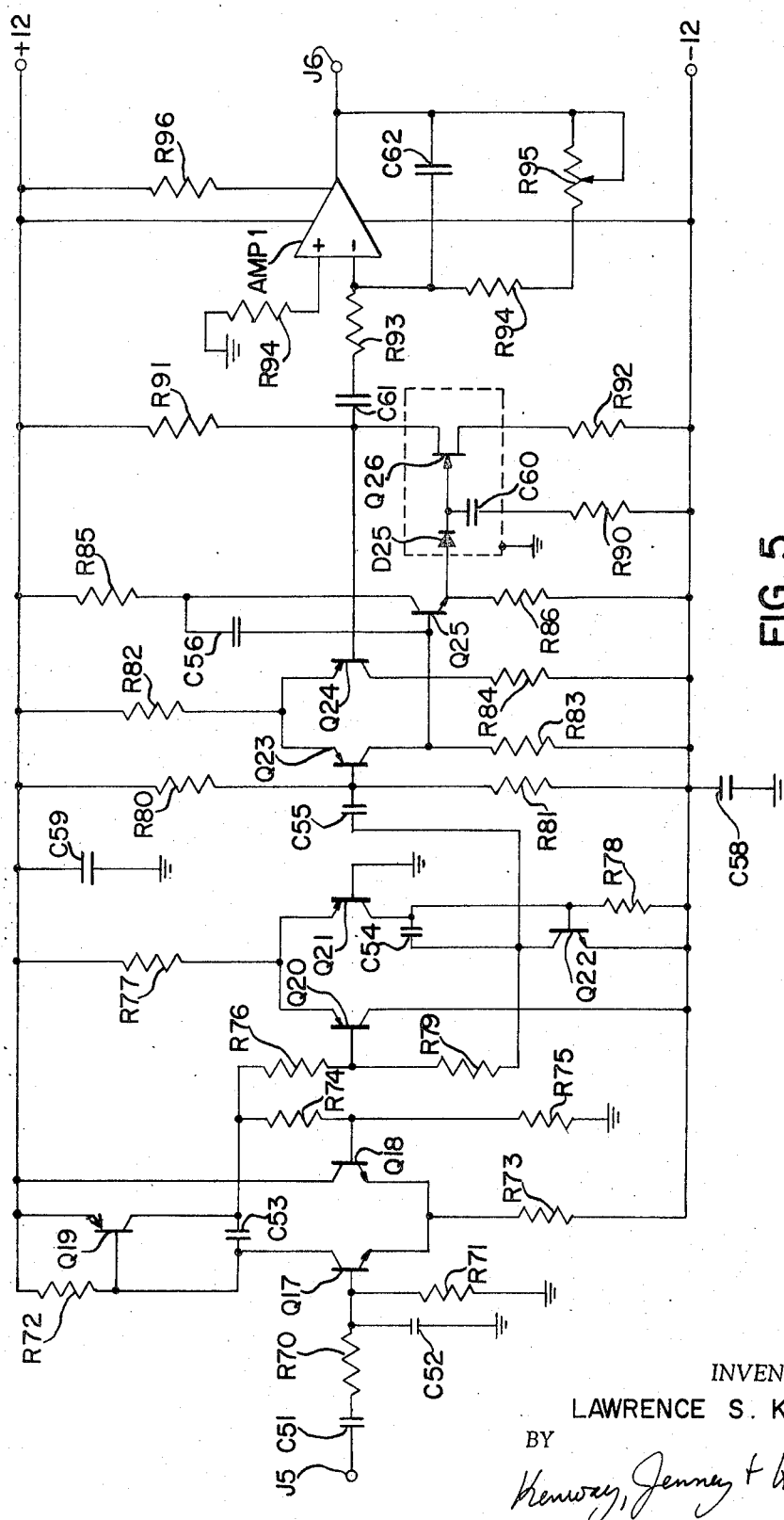
FIG. 5 is a schematic circuit diagram of a representative pulse-stretching circuit employed in the FIG. 1 apparatus.
Figure 6:
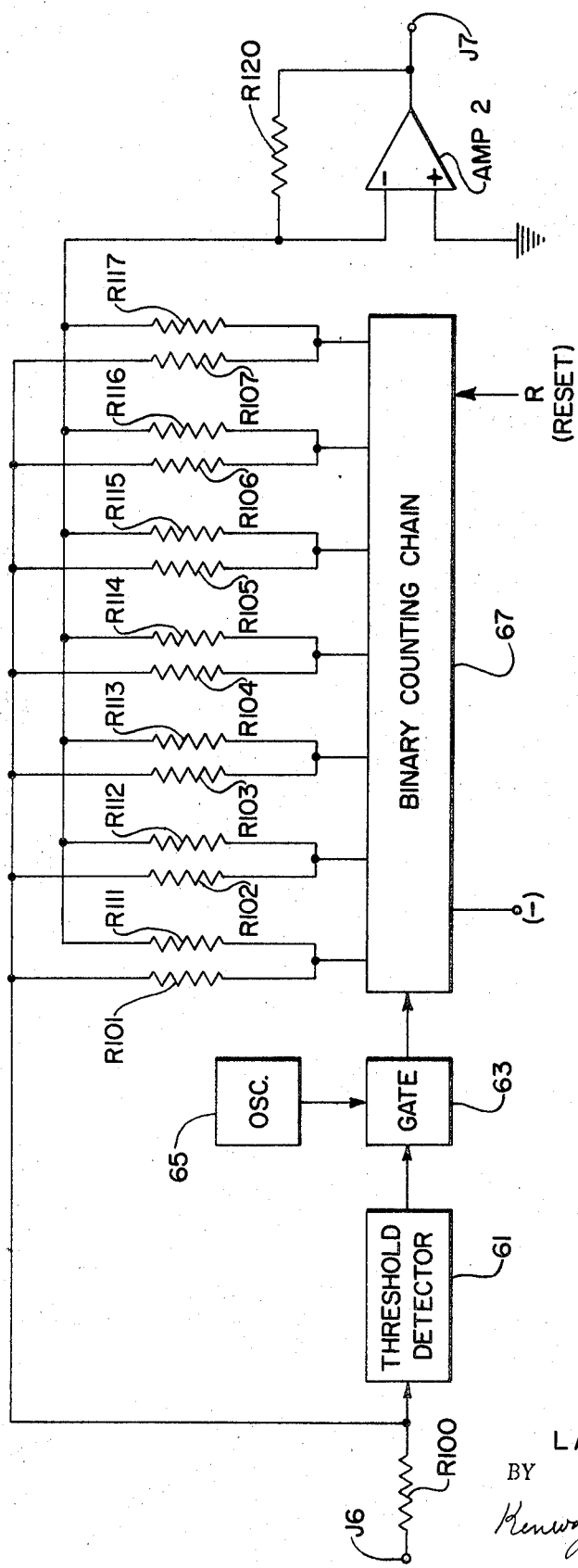
FIG. 6 is a block diagram of a representative digital amplitude storage circuit employed in the FIG. 1 apparatus.

A representative of one of the pulse stretchers 31—33 employed to extend the duration of the pulse is illustrated in FIG. 5. The theory and operation of this type of circuit is described in detail in the copending application of Donald A. Paynter, entitled "Pulse-Stretching Apparatus," which was filed on or about Apr. 15, 1969. Thus, this circuit is not described in detail herein. However, it may be noted that the transistors Q20—Q22 comprise a unity-gain buffer amplifier while transistors Q23 and Q24 form a differential input stage. The differential stage drives an emitter-follower transistor Q25 to charge a charge-storing capacitor C60 through a diode D25. The voltage on capacitor C60 is applied to the gate of a field-effect transistor Q26 and the drain voltage from transistor Q26 is returned back to the differential input stage (Q23, Q24) as a feedback signal. As is described in greater detail in the aforesaid copending application, the operation of this circuit is to provide at the drain terminal of transistor Q26 a voltage which is substantially proportional to the peak valve of a pulse input signal applied to the differential input stage. An operational amplifier AMP1 proportional a corresponding signal at low impedance at an output terminal J6.

The positive pulse stretch circuit 41 and the negative pulse stretch circuit 43 which operate directly on the input pulse signal are essentially similar to the circuit shown, appropriate changes, e.g. omission of the inverting stage, being made for pulses of negative polarity.

While the charge on capacitor C60 will in time leak off, the output signal from the pulse stretch circuit persists or continues long enough to allow an analog-to-digital conversion which permits the value of the peak amplitude to be stored indefinitely in digital form.

The analog-to-digital converter employed as the digital amplitude storage elements 35—39 is essentially conventional and is thus illustrated in FIG. 7 only in block diagram form. The signal whose amplitude is to be stored, e.g. the output signal from one of the pulse stretcher circuits, is applied to a threshold detector circuit 61 through a resistor R100 so that the input current from this source is proportional to the signal amplitude. A feedback current is also applied to this input as described hereinafter. The threshold detector circuit 61 operates to open a gate circuit 63 when the sum of the input currents applied to the threshold detector is above a predetermined level or threshold. When the gate 63 is thus opened, the output signal from a fixed frequency oscillator 65 is passed to a binary counting chain 67. Each of the successive binary stages provides a negative output signal when that stage is set. Further, each output stage is connected through a respective resistor R101—R107 to the input terminal of the threshold detector 61. The resistors R101—R107 are graded in resistance value on powers of two so that the current applied to the threshold detector input terminal in response to the operation of each binary stage is proportional to the significance of that stage in the total count. Thus, there is applied to the input terminal of detector 61 a negative feedback current which is proportional to the total count accumulated in the binary counting chain 67. From the foregoing, it will be understood by those skilled in the art that the gate 63 will thus be held open until the feedback current provided by the counting chain through the resistors R101-—R107 substantially equals the positive current due to the input signal. At this point the gate 63 will be closed so that the total count is effectively stored in the counting chain 67.

The output signal from each of the binary stages is also connected through a respective resistor R111—R117 to the inverting input of an operational amplifier AMP2. Each of the resistors R111—R117 is equal in value to the respective one of the resistors R101—R107 and thus the current applied from the counting chain to the operational amplifier AMP2 will be equal to the feedback current bucked against the input signal to close the gate 63 and thus also equal to the amplitude of the input signal. Negative feedback is provided around operational amplifier AMP2 through a resistor R120 and thus this amplifier will provide an output signal which is proportional to the binary count stored in the binary counting chain 67.

While only seven stages have been shown for purposes of illustration, it will be understood that the binary counting chain may be extended to provide any desired degree of accuracy. Since the pulse stretchers 31—33 provide signals of substantial duration as contrasted with the relatively short time periods being measured, a quite accurate analog-to-digital conversion may be provided. While the digital amplitude storage circuits illustrates provided an analog output signal, that is an output signal having an amplitude which is proportional to the measured parameter, it should be understood that a digital readout could easily be provided, either directly from the binary counting chain illustrated or by using a decimal counting chain in its place, making corresponding changes in the resistive feedback matrix. A reset signal R is applied to the binary counting chain 67 to reset the chain prior to each measurement operation.

The operation of this apparatus may then be summarized substantially as follows, taking as an example the case in which the characteristics of a single positive-going pulse are to be measured. In order to measure the time-dependent parameters most accurately, it is necessary that the pulse amplitude be known at least approximately. The positive discriminators 11 and 12 are then set to appropriate levels for determining the rise time of such a pulse. Settings of 10 percent and 90 percent of the expected peak amplitude are typical. The negative discriminators 13 and 14 are then set to levels appropriate for defining the fall time. As with the rise time determination, threshold levels of 90 percent and 10 percent respectively of the peak amplitude are appropriate. The positive discriminator 15 and the negative discriminator 16 are set to levels appropriate for defining or measuring the pulse width or duration. Typically, both of these discriminators will be set to a level equal to 50 percent of the expected pulse amplitude.

When the positive-going input pulse is applied, the positive discriminators 11 and 12 generate respective timing signals as the signal amplitude passes the preselected thresholds. These timing signals are passed by the respective diode gates 21 and 22 and operate to start and stop the time-to-pulse-height conversion performed by the circuit 27. Although the output signal provided by the time-to-pulse-height converter circuit 27 is itself a relatively brief pulse due to the requirement that quite small timing capacitors be used to measure relatively short time intervals, the pulse stretch circuit 31 provides a signal which continues long enough for the digital amplitude storage circuit 35 to perform an analog-to-digital conversion and thereby preserve indefinitely the value of the measured rise time parameter. While the negative discriminators 13 and 14 generate reset pulses during the positive-going excursion of the pulse, i.e. due to the resetting of the respective tunnel diodes, these reset pulses are blocked by the diode gates 23 and 24.

During the negative-going excursion of the positive-going pulse, the negative discriminators 13 and 14 generate timing signals which control the time-to-pulse-height converter circuitry 28. The time-to-pulse-height converter circuitry 28 thus provides a signal having an amplitude which is proportional to the fall time of the input pulse being measured. The amplitude of this pulse is stretched by the circuit 32 and stored by the digital amplitude storage circuit 36.

For the pulse width measurement the positive discriminator 15 provides a timing signal during the positive-going excursion of the input pulse while the discriminator 16 provides a timing signal during the negative-going excursion. Thus, the capacitor-charging circuit which forms part of the time-to-pulse-height circuitry 29 operates between the positive and negative-going excursions to provide an output pulse having an amplitude which is proportional to pulse width. The amplitude of this pulse is then stretched and stored as with the previous signals.

The positive pulse stretch circuit 41 provides an output signal having an amplitude which is substantially proportional to the peak value of the original pulse signal and this amplitude, stored by the digital amplitude storage circuit 38, represents the amplitude of the original pulse. The negative pulse stretch circuit 43 similarly provides a signal which is proportional to any negative undershoot of the original pulse.

As the timing signal which terminates each time-to-pulse-height conversion is generated, these signals are applied also to the test complete and lock out circuitry indicated generally at 49. Preferably, this circuit operates to remove the forward biasing from any of the diode gates which were previously open, so as to block any further timing signals from the time-to-pulse-height converters 27—29. Thus, any further pulses which may be received are ignored until a reset signal is applied.

Since the apparatus is operative on single pulses, an appropriate reset signal may be generated either manually or by automatic sequencing or test apparatus as will be apparent to those skilled in the art.

In measuring characteristics of a negative-going pulse, the negative discriminators 13 and 14 are employed for measuring the rise time rather than the fall time, the respective thresholds being set to appropriate levels. In this case the switching matrix 45 operates to apply the output signal from the storage circuit 36 to the rise time output lead and, conversely, the signal provided by the positive discriminators 11 and 12 to the fall time output lead. In like manner, the roles of the negative discriminator 16 and the positive discriminator 15 are reversed in controlling the time-to-pulse-height converter circuitry 29 which measures the pulse width, i.e., the negative discriminator 16 starts the capacitor-charging process whereas the positive discriminator 15 stops the process.

As the switching matrix 17 allows either the A or the B input signal to be applied to any given one of the discriminators 11—16, it can be readily seen that this apparatus will also measure the interval between successive, closely-spaced pulses and that the pulse may be either positive or negative-going or of opposite polarity. Further, the points at which the timing starts and stops can be independently selected by means of the respective discriminator thresholds. In such operation, the switching matrix 45 is preferably operated in conjunction with the switching matrix 17 so that the measured interval is applied to the interval output lead.

In view of the foregoing, it may be seen that several objects of the present invention are achieved and other advantageous results have been attained.

As various changes could be made in the above construction without departing from the scope of the invention, it should be understood that all matter contained in the above description or shown in the accompanying drawings shall be interpreted as illustrative and not in a limiting sense.

I claim:

1. Apparatus for measuring characteristics of a single pulse input signal, said apparatus comprising:
  a plurality of discriminator means each of which is operative to provide a respective timing signal when said input signal, applied to said discriminators, passes a respective preselectable level; and
  a plurality of timing means each of which is controlled by a respective pair of said discriminators and is operative to generate a signal which is a function of the time interval between the time said input signal passes a first one of said preselectable levels to the time said input signal passes a second one of said levels, a first of said timing means being operative during positive-going excursions of said input signal, a second of said timing means being operative during negative-going excursions of said input signal and a third of said timing means being operative between excursions of opposite polarity whereby said apparatus can provide signals which are functions of the rise time, fall time and duration of an input signal comprising a single pulse.

2. Apparatus as set forth in claim 1 further comprising means for providing signals which are functions of peak positive and negative excursions of said input signal, respectively.

3. Apparatus for measuring characteristics of a single pulse input signal, said apparatus comprising:
  a plurality of discriminator means each of which is operative to provide a respective timing signal when said input signal, applied to said discriminators, passes a respective preselectable level;
  a plurality of timing capacitors; and
  a plurality of charging means each of which is controlled by a respective pair of said discriminators and is operative to apply a predetermined charging current to a respective one of said timing capacitors from the time said input signal passes a first one of said preselectable levels to the time said input signal passes a second one of said levels, a first of said charging means being operative during positive-going excursions of said input signal, a second of said charging means being operative during negative-going excursions of said input signal and a third of said charging means being operative between excursions of opposite polarity whereby said apparatus can provide signals which are functions of the rise time, fall time and duration of an input signal comprising a single pulse.

4. Apparatus for measuring characteristics of a single pulse input signal, said apparatus comprising:
  a plurality of discriminator means each of which is operative to provide a respective timing signal when said input signal, applied to said discriminators, passes a respective preselectable level;
  a plurality of timing capacitors;
  a plurality of charging means each of which is controlled by a respective pair of said discriminators and is operative to apply a predetermined charging current to a respective one of said timing capacitors from the time said input signal passes a first one of said preselectable levels to the time said input signal passes a second one of said levels, a first of said charging means being operative during positive-going excursions of said input signal, a second of said charging means being operative during negative-going excursions of said input signal and a third of said charging means being operative between excursions of opposite polarity; and
  a plurality of means each of which is operative to provide a continuing signal which is representative of the peak value of the voltage on a respective one of said timing capacitors whereby said apparatus can provide continuing signals which are functions of the rise time, fall time and duration of an input signal comprising a single pulse.

5. Apparatus as set forth in claim 4 wherein each of said discriminator means comprises a tunnel diode.

6. Apparatus as set forth in claim 5 wherein each of said discriminator means further comprises means for applying to the respective tunnel diode a first current which varies as a function of the amplitude of said input signal and a second current which is proportional to the respective preselectable level.

7. Apparatus as set forth in claim 6 wherein said tunnel diode switches from a first state to a second state when said input signal passes the respective preselectable level during positive-going excursions and switches back during negative-going excursions and wherein said charging means includes diode gates for blocking signals generated when said diode switches back.

8. Apparatus as set forth in claim 4 wherein each of said charging means includes a tunnel diode which latches to maintain the application of charging current to the respective timing capacitor between the timing signals provided by the respective pair of discriminator means.

9. Apparatus as set forth in claim 4 wherein each of said charging means includes means for applying a substantially constant current to the respective timing capacitor.

10. Apparatus as set forth in claim 4 wherein each of said means for providing a continuing signal comprises a pulse-stretching circuit.

11. Apparatus as set forth in claim 10 wherein said pulse-stretching circuit includes a charge storage capacitor, a differential amplifier for charging said charge storage capacitor as a function of the voltage on the respective timing capacitor and a high impedance input amplifying means for providing an output signal which is a function of the charge on said charge storage capacitor, said output signal being also applied to said differential amplifier as a feedback signal for controlling the charging of said charge storage capacitor.

12. Apparatus as set forth in claim 4 wherein each of said means for providing a continuing signal includes means for digitally encoding and storing the peak value of the voltage on the respective timing capacitor.

13. Apparatus as set forth in claim 4 further comprising means for providing continuing signals which are proportional to the peak positive and negative excursions of said input signal, respectively.

14. Apparatus as set forth in claim 4 including means responsive to the timing signals which terminate charging of said timing capacitors for providing a signal indicating completion of a measurement.

15. Apparatus for measuring characteristics of a single pulse input signal, said apparatus comprising:
- a plurality of tunnel diode discriminators each of which is operative to provide a respective timing pulse when said input signal passes a respective preselectable level;
- a plurality of timing capacitors;
- a plurality of charging means each of which includes a tunnel diode latch which is switched from a first state to second state by a timing pulse from one of said discriminators and is switched back by a timing pulse from another of said discriminators and includes also means operative to apply a predetermined charging current to a respective one of said timing capacitors when said latch is in its second state, a first of said charging means being operative during positive-going excursions of said input signal, a second of said charging means being operative during negative-going excursions of said input signal and a third of said charging means being operative between excursions of opposite polarity;
- a plurality of pulse-stretching circuits each of which is operative to provide a continuing signal having an amplitude which is substantially proportional to the peak value of the voltage on a respective one of said timing capacitors; and
- a plurality of digital amplitude storage circuits controlled by respective ones of said pulse-stretching circuits for providing stored signals which are representative of the amplitudes of said continuing signals whereby said apparatus can provide stored signals which are functions of the rise time, fall time and duration of an input signal comprising a single pulse.

16. Apparatus for measuring characteristics of a single pulse input signal, said apparatus comprising:
- a pair of tunnel diode discriminators each of which is operative to provide a respective timing pulse when said input signal passes a respective preselectable level;
- a timing capacitor;
- a tunnel diode latch which is switched from a first state to a second state by a timing pulse from one of said discriminators and is switched back by a timing pulse from the other of said discriminators and includes also means operative to apply a predetermined charging current to said timing capacitor when said latch is in its second state;
- a pulse-stretching circuit operative to provide a continuing signal having an amplitude which is substantially proportional to the peak value of the voltage on said timing capacitor; and
- a digital amplitude storage circuit controlled by said pulse-stretching circuit for providing a stored signal which is representative of the amplitudes of said continuing signal whereby said apparatus can provide a stored signal which is a function of a time characteristic of an input signal comprising a single pulse.